M. L. PATERSON.
SHOE.
APPLICATION FILED JAN. 5, 1917.

1,298,089.

Patented Mar. 25, 1919.

Inventor:
Morton L. Paterson
by Emery, Booth, Janney & Varney
Attys.

UNITED STATES PATENT OFFICE.

MORTON L. PATERSON, OF WILMETTE, ILLINOIS, ASSIGNOR TO CONVERSE RUBBER SHOE COMPANY, A CORPORATION OF MASSACHUSETTS.

SHOE.

1,298,089.

Specification of Letters Patent. Patented Mar. 25, 1919.

Application filed January 5, 1917. Serial No. 140,821.

*To all whom it may concern:*

Be it known that I, MORTON L. PATERSON, a citizen of the United States, and resident of Wilmette, county of Cook, State of Illinois, have invented an Improvement in Shoes, of which the following description, in connection with the accompanying drawings, is a specification, like characters on the drawings representing like parts.

This invention relates to shoes and more particularly to overshoes or arctics and aims to provide a shoe having an upper which is impervious to moisture.

The character of the invention may be best understood by reference to the following description of an embodiment thereof shown in the accompanying drawing, wherein:—

Figure 1:
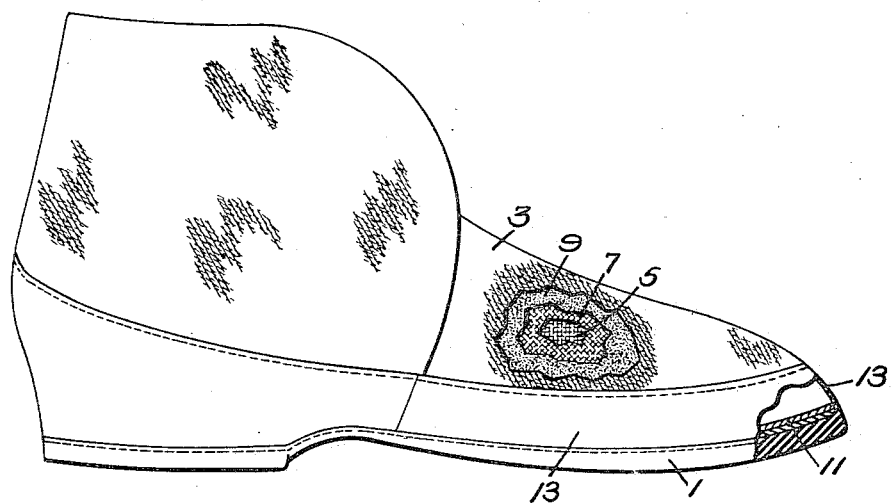
Figure 1 is a side elevation of an arctic shown herein as embodying the invention.
Figure 2:
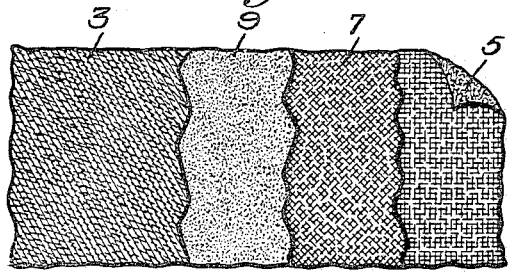
Fig. 2 is a view showing the composite layers of which the upper is made.
Figure 3:
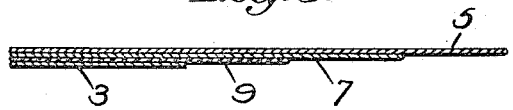
Fig. 3 is a sectional view of the layers shown in Fig. 2.

Referring to the drawing, the arctic shown therein as embodying the invention, comprises a sole 1 of rubber, and an upper comprising an outer layer 3 of cashmerette or other suitable cloth having its inner surface coated with rubber; an inner layer 5 of fleece lined with rubber; a layer 7 of canvas impregnated with rubber, and a pure rubber layer 9 intermediate the outer and inner layers. All of these layers may be secured together by a rubber cement.

The rubber, canvas and fleece layers have edge portions interposed between and cemented to the outer, rubber sole and an inner sole 11 consisting of layers of rubber and canvas; and the outer, cloth layer is overlaid by and is cemented to a rubber strip 13 projecting upward from and integral with the outer sole.

The outer layer furnishes the desirable cloth finish. The inner fleece layer furnishes the desired warmth. The canvas layer impregnated with rubber furnishes the desired strength reinforcement and stiffness. The rubber layer absolutely prevents the penetration of moisture through the upper and preferably is located next to the outer layer so that it will prevent moisture from penetrating through the fleece and cement layers.

By the construction described there is provided an arctic which is strong in construction, warm, of pleasing appearance and absolutely waterproof.

Having described one embodiment of the invention without limiting the same thereto, what I claim as new and desired to secure by Letters Patent is:

Claims.

1. A shoe having an outer sole, an inner sole, and an upper comprising an outer cloth layer, an inner warmth-giving layer, a layer of canvas impregnated with rubber, and a rubber layer, said layer of canvas having an edge portion interposed and secured between said soles.

2. A shoe having an outer sole, an inner sole, and an upper comprising an outer cloth layer, an inner layer of fleece lined with rubber, and a rubber layer intermediate said layers, said layer of fleece lined with rubber having an edge portion interposed and secured between said soles.

3. A shoe having an outer sole, an inner sole, and an upper comprising an outer cloth layer 3, an inner layer of rubber-lined fleece, a layer of canvas impregnated with rubber, and a rubber layer between said inner and outer layers; all of said layers being cemented together; said layer of canvas and said layer of rubber being interposed and secured between said inner and outer soles.

4. In a shoe having a rubber sole with a marginal rubber strip projecting upwardly therefrom and an inner sole; an upper comprising an outer cloth layer secured to said rubber strip and strength-giving and pure rubber layers having edge portions interposed between and secured to said soles.

In testimony whereof, I have signed my name to this specification.

MORTON L. PATERSON.